Feb. 7, 1939.   D. B. BAKER ET AL   2,146,168
TRACTOR
Filed July 17, 1937   3 Sheets-Sheet 3

Inventors
David B. Baker,
Clifford R. Rogers
and William O. Bechman
By V. F. Lassagne
Atty.

Patented Feb. 7, 1939

2,146,168

UNITED STATES PATENT OFFICE 2,146,168

TRACTOR

David B. Baker, Riverside, Clifford R. Rogers, Oak Park, and William O. Bechman, Chicago, Ill., assignors to International Harvester Company, a corporation of New Jersey Application July 17, 1937, Serial No. 154,220

7 Claims. (Cl. 180—9.1)

This invention relates to a tractor and more particularly to a new and improved housing provided with compartments for containing the transmission and driving mechanism of a tractor. Specifically the invention relates to the provision of a housing for a tractor of the track laying type in which the general construction necessitates the use of a comparatively large casing or housing which usually serves as a main body portion. This housing is provided with compartments for containing the various mechanisms which drive the drive sprocket wheels and the endless track belts of the tractor. The operator's station and controls for the mechanism are mounted on a platform on top of the housing and, on the whole, the operator's station with its related controls forms a superstructure of considerable size and complexity.

In tractors of the crawler, or track laying, type, the steering mechanisms, which include clutch and brake mechanisms, are located in transverse alignment in compartments in the housing. The transmission is located forwardly in a compartment in the housing and has a final drive bevel pinion meshing with a larger bevel gear keyed to complementary aligned shafts, upon which parts of the clutch and brake or steering mechanisms are carried. This final drive shafting carries at its outer ends the usual drive gearing for driving the drive sprockets of the tractor. The brake mechanisms are of the usual type comprising drums and bands thereabout. The linkage for controlling these steering clutch and brake mechanisms must be located in convenient position for operating the mechanisms and it is also desirable that they be provided in a manner to effect compact and dirt-free construction. For these reasons, it is desirable to locate as much of the control linkage as possible within the housing; therefore, provision must be made for the positioning of the control linkage in the brake and clutch mechanism compartments. However, a problem arises in the adjustment and repairment of the control linkages and the steering mechanism. Previously, the usual practice has been to remove the entire operator's station, which includes the seat, platform, and hand controls for operating the tractor. It will be appreciated that demounting this entire superstructure resulted in a task involving considerable time and labor. Therefore, the present invention contemplates the provisions of means whereby the steering mechanisms and control mechanisms may be adjusted and repaired in an easy and efficient manner.

The principal object of the invention is to provide a tractor housing having compartments for the transmission, drive, and steering mechanisms, in which the control linkages for these mechanisms are made accessible for repair and adjustment through an opening in the housing.

An important object of the invention is to locate these openings in the bottom of the housing.

Still another important object is to locate the control linkages for the steering mechanisms within specially provided portions in the steering mechanism compartments.

Another object is to provide the housing with portions adapted to support parts of the control linkages in the vicinity of the openings in the bottom of the housing.

Another object is to provide openings of sufficient size to enable portions of the steering mechanism to be removed therethrough in the event replacement of the parts becomes necessary.

Still another object is to provide the housing with means for maintaining adjustment on the brake bands of the brake mechanisms.

Still another object is to provide for the connection in the housing of coil springs for maintaining the control linkages in retracted position.

Still another object is generally to provide a housing within which greater portions of the control linkages may be mounted, thus providing a housing of simple, compact, and dirt-free design.

Briefly and specifically, these and other important objects are achieved by providing a housing having a transmission compartment located centrally therein, a drive gearing compartment rearwardly and in alignment with the transmission compartment, and a pair of steering mechanism compartments at either side of the drive gearing compartment and having their greater portions in transverse alignment therewith. The forward portions of the steering mechanism compartments are reduced and extend forwardly alongside the transmission compartment and carry therein short shafts, which provide for the mounting of portions of the control linkages. Each steering mechanism compartment is provided at its bottom with an opening over which a removable cover plate is secured. The housing is provided in each steering mechanism compartment with portions for supporting certain parts of the control linkages. These portions are provided in the vicinity of the openings and, when the cover plates are removed, are accessible for adjustment and repairment. It is also possible to remove the brake band from the brake mechanism through an opening, as will be hereinafter more fully described.

A more comprehensive understanding of the objects and desirable features of the invention may be had from the following detailed description taken in conjunction with the accompanying sheets of drawings, in which.

Figure 1:
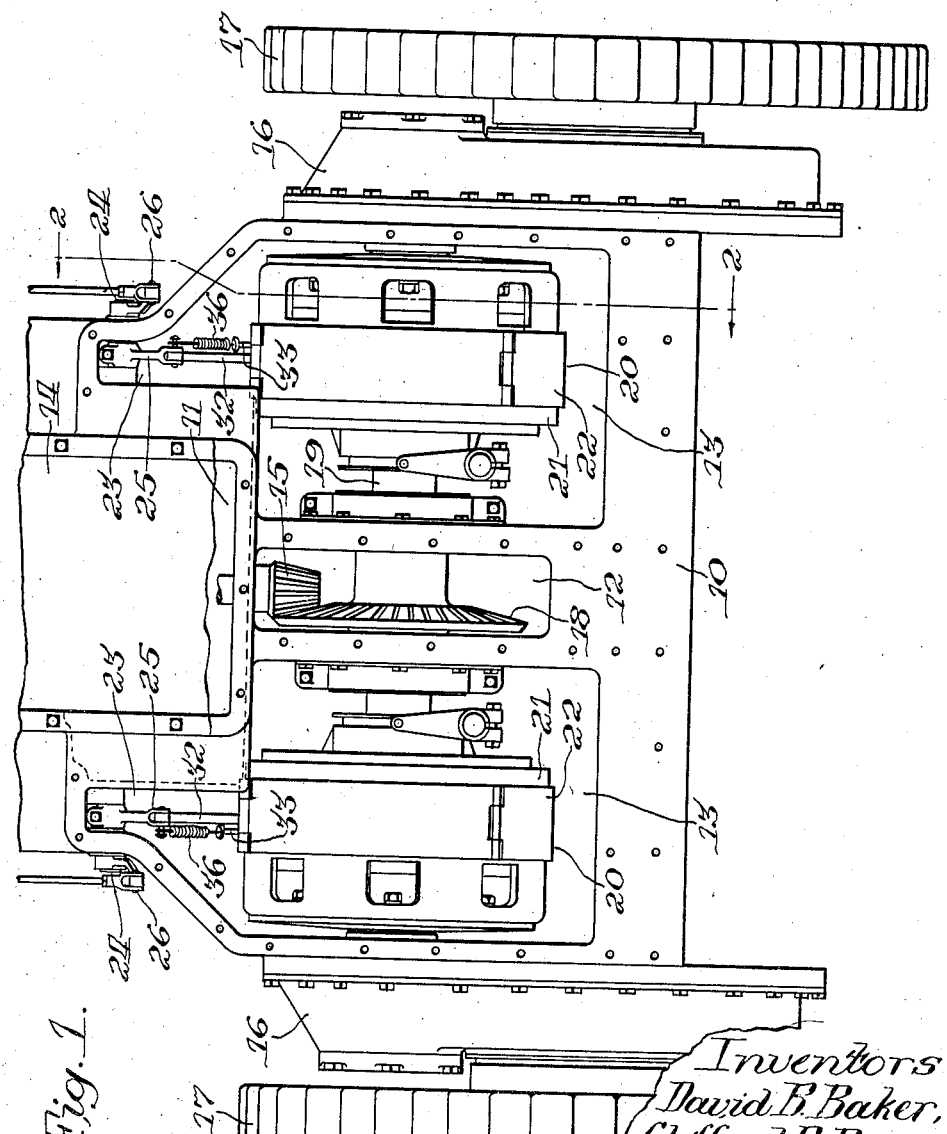
Figure 1 is a general plan view of the rear portion of a tractor of the track laying, or crawler, type, showing the housing with the operator's station, cover plates, and other superstructure removed.

Only a sufficient portion of the tractor has been shown as is deemed necessary to illustrate the invention. A rear body portion or housing 10, which forms a main part of the tractor body as is more or less conventional, is provided with a transmission mechanism compartment 11, a drive gearing compartment 12, and a pair of steering mechanism compartments 13. A cover plate 14 is secured over the transmission compartment 11, a portion thereof being broken away to show the position of a bevel drive pinion and shaft 15. As previously described, the superstructure and cover plates have been omitted from the housing 10 to show better the shape and location of the steering mechanism compartments 13. At each side of the housing 10, a final drive housing 16 is secured. This housing contains the final drive gearing, not shown, for driving drive sprocket wheels 17.

As shown in Figure 1, the drive pinion 15 enters the drive gearing compartment 12 and meshes with a bevel gear 18 carried on a transverse aligned shafting 19. This shafting extends transversely of the housing and carries thereon in each steering mechanism compartment steering mechanism 20. Each steering mechanism comprises a combination disk clutch and brake band mechanism, as is more or less conventional for the steering of a tractor of the track laying type. Each brake mechanism includes a drum 21 and a brake band 22. Also, as best shown in Figure 1, the steering mechanism, or brake and clutch, compartments are reduced and tapered at their forward ends, as at 23, to support cross shafts 24 and arms 25 for the brake mechanism control linkages. Outside the housing each shaft 24 rigidly carries operating linkage 26, which is connected respectively to independent control levers adjacent the operator's station, not shown.

In the bottom of the housing 10 and in each steering mechanism compartment 13, an opening 27 is provided, which is closed by a removable cover plate 28. In the vicinity of each opening 27 the housing is provided with a portion in each steering mechanism compartment for supporting a cross-shaft 29, which carries suitable brake actuating members 30 to which each brake band 22 is secured. Each cross-shaft 29 is held against axial displacement in the housing by a set screw or stud 29ª. Each brake actuating member 30 is formed with an arm 31, which extends forwardly in the housing and which is connected by a link 32 to the aforementioned brake arm 25 on the shaft 24. The opposite end of each brake band 22 is adjustably connected to a portion of the brake actuating member 30 by means of an adjustable connection 30ª. Thus far, it will be seen that the control linkage for each brake mechanism is mainly carried within the housing 10 in the steering mechanism compartment 13 and the forwardly extending portion 23 thereof. It will also be noted that the cover plates 28 are shaped in a manner to accommodate the lower parts of the control linkage.

The forward portion of the housing in each steering mechanism compartment 13 carries a stud 33, which is threaded into a member 34 carried by the housing. This stud engages the brake band 22, and a coil spring 35 is connected at one end to the brake band 22 and at the other end to an ear on the member 34. This means contributes to the adjustment of the brake mechanisms. A coil spring 36 is connected at one end to the arm 25 and at the other end to an ear on the member 34. This coil spring maintains the control linkage in retracted position.

Figure 2:
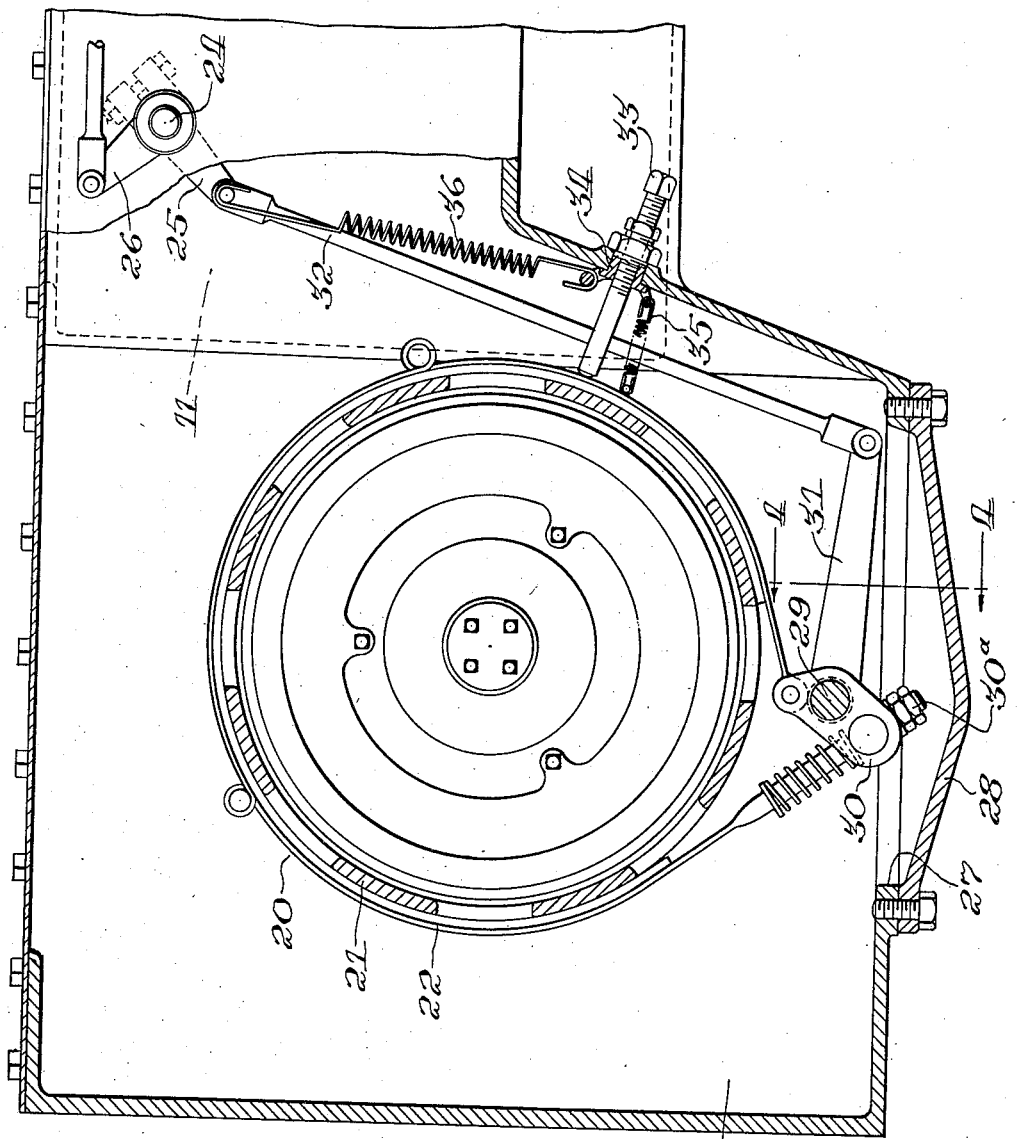
Figure 2 is a side sectional view taken on the line 2—2 of Figure 1, showing an opening in the bottom of the housing, the position of the control linkages, and the means for maintaining the control linkage in retracted position.
Figure 3:
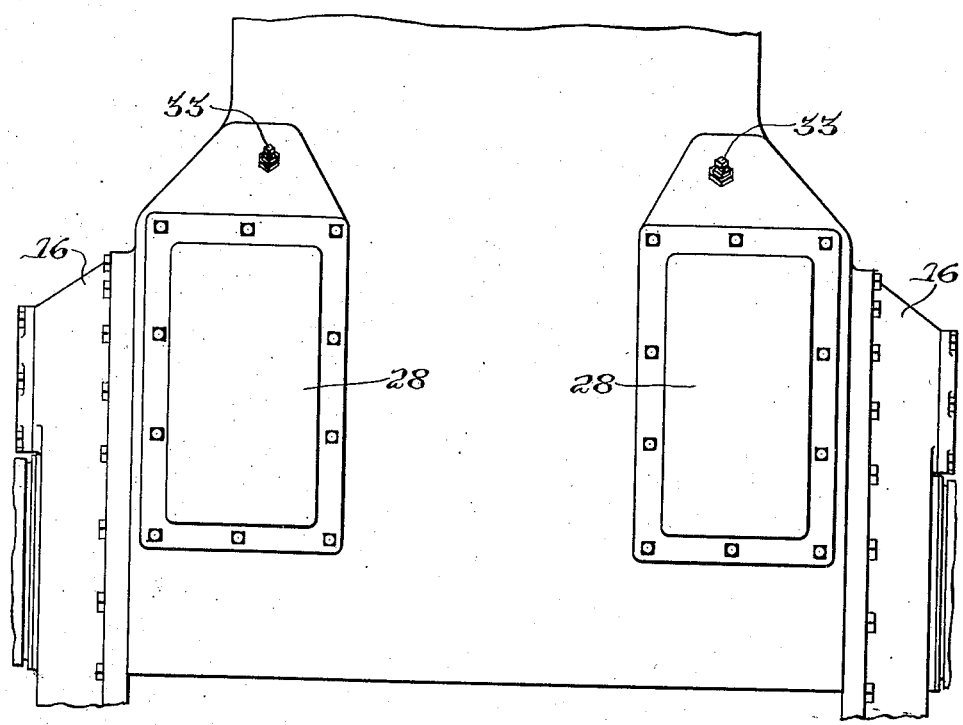
Figure 3 is a bottom plan view of the housing showing the specific location of the cover plates over the openings; and, Figure 4 is an end sectional view taken on the line 4—4 of Figure 2, showing at the bottom of the steering mechanism compartment of the housing the portions for supporting the lower members of the control linkage.
Figure 4:
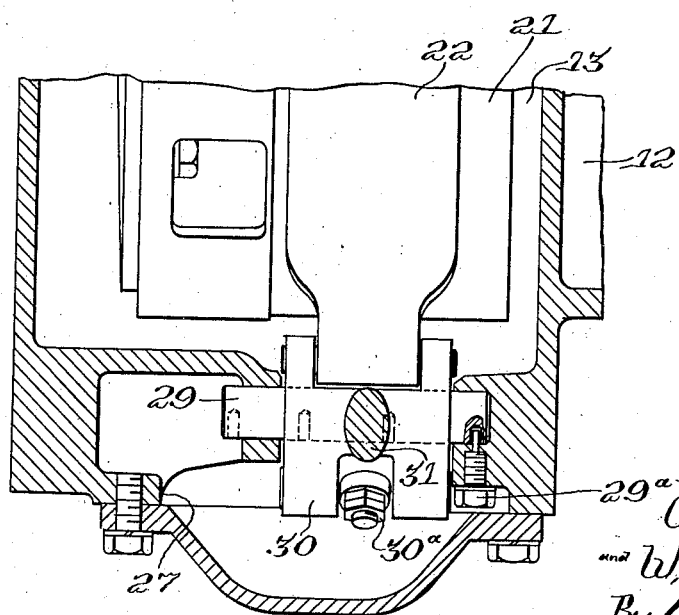

From an examination of Figure 2 it will be noted that the lower portion of the control linkage is supported in the housing in the vicinity of the opening 27 and the cover plate 28. In the event that adjustment or repairment of the brake mechanism becomes necessary, the cover plate 28 may be removed and such minor servicing may be effected. For instance, should adjustment of the band become necessary as the band wears, adjustment thereof is made a simple operation through the provision of the housing with the openings therein, as shown and described. A cover plate 28 is removed and adjustment of the adjustable connection 30ª may be readily and quickly made. Also, should it become necessary to replace a brake band, the control link 32 is first disconnected from the arm 31. Next, the adjustable connection 30ª is disconnected. Then the shaft 29 is slid sidewise in the housing by removal of the set screw or stud 29ª, as shown in Figure 4. It will be noted that the housing is provided with a considerable recess at one side thereof to allow for axial movement of the shaft 29. With the foregoing parts disconnected, the stud 33 is backed off a short distance and the coil spring 35 is disconnected from the member 34. The entire brake band can then be pulled out through the opening 27. A simple operation for removing the band is found in the use of a rope or wire connected to one end of the band. When the band is pulled out through the opening 27, the rope or wire becomes trained about the brake drum 21 and is left in that position and the band 22 disconnected therefrom. When a new or relined band is to be placed in position, one end thereof is connected to the remaining rope or wire. The rope or wire is now pulled through the opening 27 in the opposite direction and the new or relined band is drawn in position about the drum 21. The component part of the brake control linkage are now connected and restored to operative position and the proper adjustments made. It will be appreciated that the foregoing operation is considerably simpler and more efficient than an operation which necessitates the removal of the entire operator's station, superstructure, and adjacent hand controls.

It will be understood that requirements for similar servicing operations are present in various types of tractors or in various portions of the mechanisms thereof and that the present invention is just as applicable in those instances. Moreover, it is obvious that numerous modifications and alterations may be made in the above described construction without departing from the spirit and scope of the invention as defined in the following claims.

What is claimed as new is:

1. In a tractor, a housing having a forward, centrally disposed transmission compartment, a rearward centrally disposed drive gearing compartment, and a pair of brake mechanism compartments, one disposed at each side of the drive gearing compartment and having their greater portions substantially in transverse alignment with said drive gearing compartment, said brake compartments having smaller portions extending forwardly alongside the transmission compartment for housing brake actuating means, said housing being formed at the bottom of each brake compartment with portions for supporting a second brake actuating means operably connected to the first means, said housing being further provided with an opening respectively in the vicinity of each second actuating means, and a cover plate secured respectively over each of said openings, said cover plates being removable to provide for access to the second actuating means and brake mechanism for adjustment of repairment thereof.

2. In a tractor, a housing having a forward, centrally disposed transmission compartment, a rearward centrally disposed drive gearing compartment, and a pair of brake mechanism compartments, one disposed at each side of the drive gearing compartment and having their greater portions substantially in transverse alinement with said drive gearing compartment, each of said brake compartments being reduced at its forward end and having portions thereat for supporting a rockshaft of brake actuating linkage for the respective brake mechanism, and means carried by the housing respectively in each brake compartment serving as a support for additional portions of the respective brake actuating linkage.

3. In a tractor, a housing having a forward, centrally disposed transmission compartment, a rearward centrally disposed drive gearing compartment, and a pair of brake mechanism compartments, one disposed at each side of the drive gearing compartment and having their greater portions substantially in transverse alinement with said drive gearing compartment, each of said brake compartments being reduced at its forward end and having portions thereat for supporting parts of brake actuating linkage for the respective brake mechanism, a member carried by the housing respectively in each brake compartment serving as a support for additional portions of the respective actuating linkage and also as a support for means associated with the respective brake mechanism.

4. In a tractor, a housing having a forward, centrally disposed transmission compartment, a rearward centrally disposed drive gearing compartment, and a pair of brake mechanism compartments, one disposed at each side of the drive gearing compartment and having their greater portions substantially in transverse alinement with said drive gearing compartment, each of said brake compartments having a reduced portion at one end thereof for housing brake actuating linkage, said housing being formed at the bottom of each brake compartment with portions for supporting a second brake actuating means, means carried by the housing within each compartment serving to support additional portions of the respective brake actuating linkage, said housing being further provided with an opening respectively in the vicinity of each of said second actuating means, and a cover plate secured respectively over each opening, each of said cover plates being formed with a deeper portion to accommodate movement of each second actuating means, said cover plates being removable to provide access to the second actuating means and to the aforesaid additional portions of the brake actuating linkage for adjustment or repairment thereof.

5. In a tractor, a housing having a forward, centrally disposed transmission compartment, a rearward centrally disposed drive gearing compartment, and a pair of brake mechanism compartments, one disposed at each side of the drive gearing compartment and having their greater portions substantially in transverse alinement with said drive gearing compartment, each of said brake compartments having a reduced portion at one end thereof for housing brake actuating linkage, said housing being formed at the bottom of each brake compartment with portions for supporting a second brake actuating means, a portion of the housing within each compartment serving to support additional portions of the respective brake actuating linkage and also to support means associated directly with the respective brake mechanism, said housing being further provided with an opening respectively in the vicinity of each of said second actuating means, and a cover plate secured respectively over each opening, each of said cover plates being formed with a deeper portion to accommodate movement of each second actuating means.

6. In a tractor having a body provided with a housing formed with compartments for respectively containing the transmission, drive, and brake mechanisms, said brake compartments being respectively reduced and tapered at one end to house brake actuating linkage, said housing being provided at the bottom of each brake compartment with a portion for removably supporting a second brake actuating linkage operably connected to the first actuating linkage, said housing being further formed at the bottom of each brake compartment with an opening in the vicinity of said second actuating linkage, and a cover plate secured respectively over each of said openings, said cover plates being removable from the bottom of the housing thereby to permit access to the brake compartments from below the tractor body.

7. In a tractor, a housing having a rearward centrally disposed drive gearing compartment, and a pair of brake mechanism compartments, one disposed at each side of the drive gearing compartment and substantially in transverse alinement therewith, each of said brake compartments having a portion at an upper end thereof for housing brake actuating linkage, said housing being formed at the bottom of each brake compartment with portions for supporting a second brake actuating means, means carried by the housing within each compartment and disposed between the first brake actuating linkage and the second brake actuating means for supporting additional portions of said respective brake actuating linkage, said housing being further provided with an opening respectively in the vicinity of each of said second actuating means, and a cover plate secured respectively over each opening, each of said cover plates being removable to provide access to the second actuating means and to the aforesaid additional portions of the brake actuating linkage for adjustment or repairment thereof.

DAVID B. BAKER.
CLIFFORD R. ROGERS.
WILLIAM O. BECHMAN.